United States Patent Office 3,537,928
Patented Nov. 3, 1970

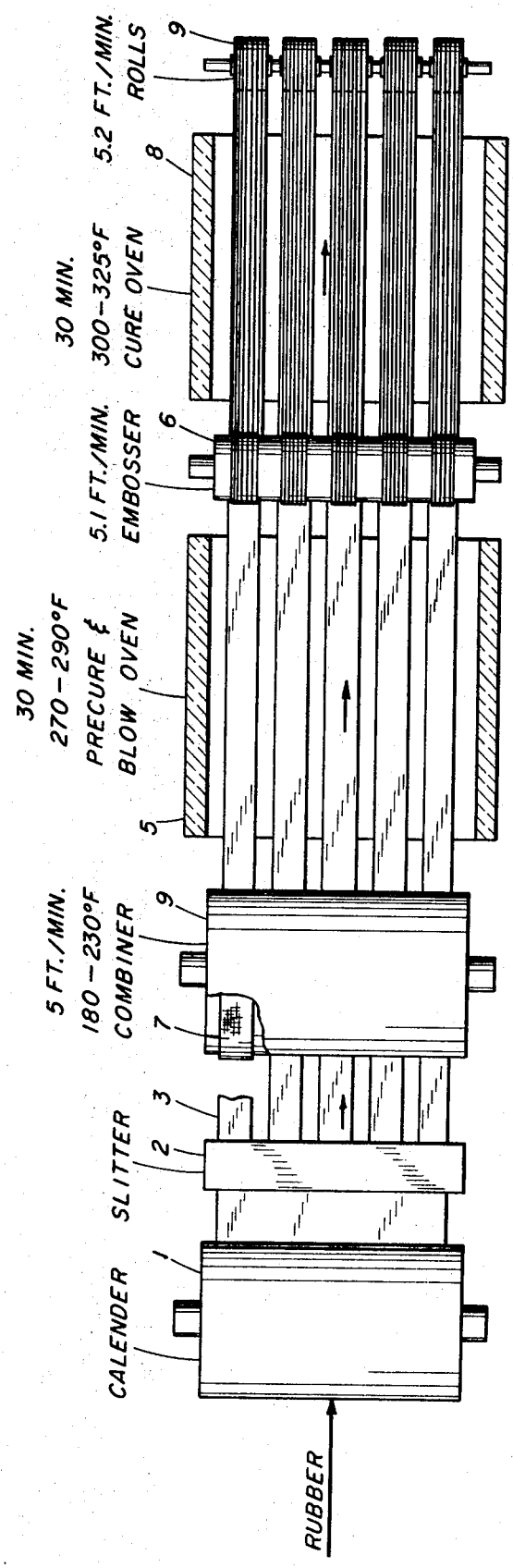
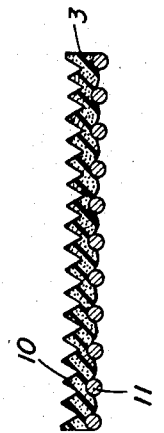

3,537,928
PROCESS FOR PREPARING LAMINATED AND EMBOSSED ELASTIC FABRIC
Ralph A. Maglio and Cyril N. Harper, Easthampton, Mass., assignors to J. P. Stevens & Co., Inc., New York, N.Y., a corporation of Delaware
Filed Feb. 17, 1967, Ser. No. 616,986
Int. Cl. B32b 5/18
U.S. Cl. 156—79                    4 Claims

ABSTRACT OF THE DISCLOSURE

A sheet of partially cured but still plastic elastomer compounded with a blowing agent is softened and laminated onto textile fabrics; the laminate is then precured at a temperature sufficient to activate the blowing agent, producing cell tight elastomer. The laminate is then passed through embossing rolls, which emboss a design, usually lengthwise ridges, in the elastomer, cured at a higher temperature until the elastomer is completely cured and then packaged.

BACKGROUND OF THE INVENTION

There has been for some years a demand for laminates in which an elastomer is laminated on a textile fabric and transformed into a cellular or foamed product. This has a desirable surface texture of the elastomer, for example increasing its coefficient of friction so that it does not tend to slip on human skin when used for straps, belts, and the like and has a desirable soft feel or hand.

In the past such products have been made from elastomer dispersions, particularly rubber latex, which contains a frothing or foaming agent, for example a soap. It is then dried, and may be then otherwise treated. The product is in no sense unusable, but it has certain drawbacks. In the first place, the dispersion, such as latex, is foamed before applying to the fabric, and in this form it has a viscosity which is sometimes too high. The continuous phase in which the rubber is dispersed, for example in the form of an emulsion, is usually aqueous, and after applying to a textile fabric and producing rubber foam, by conventional procedures, must then be dried. The aqueous liquid in which the rubber globules are dispersed in the latex has certain chemicals, such as ammonia, which in some cases can react undesirably with a textile fabric, particularly if the latter is colored; and the removal of the dispersing medium also presents problems and can cause shrinkage or other undesirable changes in the dimensions of the elastomer or fabric. This has in the past definitely limited the field of utility of textile laminates with foamed or sponge rubber from latices.

SUMMARY OF THE INVENTION

In the present invention an elastomer composition in the form of a solid, such as formulations of partially cured rubber, whether natural or synthetic rubbers, such as various butadiene copolymers, for example the butadiene acrylonitrile copolymer, or other elastomers, such as polyurethane elastomer, chloroprene rubbers and the like are compounded with suitable blowing agents, such as nitroso compounds, diazo compounds, and other compounds which can release nitrogen, carbon dioxide, ammonia or other gases. The formulations also usually contain plasticizers and are made up into sheet form, if necessary cut to suitable dimensions where the products to be produced are ribbons, straps and the like. These are laminated with textile fabrics at a temperature where the elastomer is sufficiently plastic to be effectively laminated but at a temperature below that at which the gases from the blowing agent are released. The laminates are then subjected to a temperature sufficient to pre-cure and transform the blowing agents into gases, thereby producing cell-tight rubber or other elastomers, but still leaving the elastomer incompletely cured and plastic. The laminate is then embossed, for example with rollers which produce ridges or other design, and finally is heated to a still higher temperature which produces complete cure of the elastomer.

It should be understood that in the present invention while the elastomer or elastomer composition is not fluid as in the dispersion of a latex or rubber cement and the like, it is still soft enough to be plastic and so can be firmly laminated onto a textile fabric, slight flow taking place. The elastomer, even when laminated, is in no sense a liquid or free-flowing dispersion but is a soft and plastic solid. There is no absolute, black and white distinction between a flowable liquid dispersion or solution and a soft, plastic solid which is capable of some flow, and theoretically a soft plastic may be considered as a material of high viscosity; it is not a rigid solid, and whenever used, the term "soft, plastic solid" will be used in this sense, that it is something which does not pour or flow like a liquid but which under pressure can flow sufficiently for satisfactory bonding and change in shape of its surface. The distinction is a practical one, for the present invention is a practical process and not concerned with theoretical physics.

Another very important characteristic of the plastic solid elastomers which are the raw materials used in the production of the laminates by the process of the present invention is that they are not dissolved or dispersed in a medium which may have to be removed. This is not to say that the plastic elastomers do not contain plasticizers, which are often high boiling, fairly viscous oils; however, these plasticizers are not removed in making the laminate, and so the problems presented by the drying of the aqueous dispersing medium in latices does not arise.

It is essential to the process of the present invention that the lamination take place at a temperature at which the elastomer is plastic but below that at which blowing agents are decomposed, followed by the pre-curing at temperatures at which the blowing agents are decomposed but below that at which the elastomer loses plasticity so that it cannot be embossed, and finally that the final curing of the elastomer take place at higher temperatures. The exact temperature will vary with the chemical composition of the elastomer formulation and the particular blowing agent used. In the specific description of preferred embodiments set out below, typical temperature ranges for these steps with rubbers are set forth, but it should be understood that these are typical temperatures useful for the particular elastomers recited and the invention is not limited thereto. Other temperature ranges may be preferred with different elastomer formulations and will be chosen in conjunction with the necessary factors set out above.

It is an advantage of the invention that laminates can be prepared with almost any fabric so long as the fabric is not damaged by the temperatures required in the process. The fabrics may be of textile fibers or may be elastic fabrics. They may be woven, knitted, or otherwise produced.

Another advantage of the present invention is that complicated designs which may involve alternate stripes of rubber and fabric can be made easily by the process of the present invention on equipment of minimum complexity.

The present invention is also not limited to any particular blowing agent. Any of the well known blowing agents may be used, and in this respect the present invention does not introduce any new blowing agents or new techniques in forming cell tight elastomer. The choice of the blowing agent, however, does influence the temperature range in the step in which the laminate is pre-cured and the elastomer blown, as of course blowing agents vary in the temperature at which they decompose and set free gases. These temperatures are well known for particular blowing agents in the cell tight or blown rubber art, and the requirements are not changed by the present invention. It is also well known in the blown elastomer art that the elastomer must be sufficiently plastic during the blowing stage for the gases evolved to expand the rubber and into closed cells. As is well known, to produce cell tight or blown rubber the elastomer must not be of such low viscosity that a large number of the cells formed communicate with the surface. In other words, the plasticity of the elastomer must be such that cell tight products are produced. In the present invention these considerations are in no way changed, and it is an advantage of the present invention that no new techniques or conditions of blowing are required which are not well known in the art.

The relative thicknesses of the blown elastomer layer and the fabric may vary within wide limits, but the elastomer layer must be sufficiently thick so that embossing is possible. In general the elastomer layer before embossing will usually be of the same order of magnitude of thickness as the fabric coating, but it will usually be somewhat thicker to permit embossing. In general, after embossing the thickness represented by the high spots in the embossed surface will usually be greater than that of the fabric but will still be of the same order of magnitude.

The great flexibility in the choice of lamination thicknesses is a practical advantage and permits producing a wide range of products by means of the process of the present invention.

It should be understood that the reference to curing of the elastomer is used in its usual sense of transforming very soft elastomer into one of satisfactory strength. The chemical nature of the cure will vary with different elastomer formulations. Thus in the case of many of the rubbers, this cure will be a vulcanization process, which involves cross-linking of the rubber polymer chains with sulfur. Other elastomers may be cured by extending the polymerization and, in the case of some elastomers, such as some polyurethanes, there is curing by extending the polymerization or molecular size, and there may be some cross-linking, for example by water, usually after the laminate has left the cure oven. These different chemical mechanisms of curing proceed at different rates, and so the time in each step will vary somewhat with the nature of the elastomer. In the specific description of preferred embodiments below, typical times and processing rates are set forth which are satisfactory for the rubber formulations therein described, but the invention is not limited thereto, and for certain other elastomers different optimum times are dictated by the nature of the elastomer composition.

In addition to such ingredients as blowing agents and plasticizers, the elastomer may contain some finely divided, solid fillers. The proportion of fillers, of course, should not be so great as to prevent satisfactory blowing, but these considerations are not new with the present invention. In other words, we may consider that once the lamination with the fabric is made, the subsequent blowing and curing are carried out under the known conditions for these operations in producing blown elastomers. They are not change quantitatively by the nature of the present invention.

Reference has been made to producing an article with a layer of embossed elastomer on a fabric backing. This is by far the most common type of article produced by the present invention. It is, of course, however, possible to have more than two laminations. Thus, for example, there may be several layers of fabric and elastomer, but of course the outer layer of elastomer only will be the one which is embossed. Therefore, the terms "lamination" and "laminate" will be used in the specification and the claims to cover either two-layer laminates or multi-layer laminates.

BRIEF DESCRIPTION OF THE DRAWING

FIG. 1 shows, in diagrammatic form, the sequence of operations in the process of the present invention, and FIG. 2 is a cross-section through the laminate produced.

DESCRIPTION OF THE PREFERRED EMBODIMENTS

A sheet of natural rubber formulated with the amount of sulfur usable for soft rubber products and a blowing agent such as dinitrosopentamethylenetetramine is calendered on the calender rolls diagrammatically shown at 1 in FIG. 1, being calendered to about 0.018". This sheet is then slit to ribbons from .25" to 2" wide by a slitter of conventional design, shown diagrammatically at 2. The ribbons, which are shown at 3, are then mated with elastic fabric ribbons 7 and passed between two rolls constituting a combiner, which is shown generally diagrammatically at 4. One of the rolls may be of steel and the second of rubber, the steel roll being coated with polytetrafluoroethylene and heated to 180°–230° F., as is indicated in FIG. 1. The hardness of the rubber roll is sufficient to produce good adhesion of the rubber to the elastic fabric 7 but is sufficiently soft so as not to force the fabric open, which would cause the fabric to be processed with a strain imposed on its elastomeric warp threads 11, (FIG. 2). A typical speed of lamination through the rolls 4 is five feet per minute, as is indicated on FIG. 1.

The laminated ribbons then pass through a precuring and blowing oven 5, which is shown diagrammatically in FIG. 1 and which is of a length so that the dwell of the ribbons in the oven is approximately 30 minutes. The temperature of the oven is 270°–290° F. for the natural rubber laminate. The showing of the oven in FIG. 1 is purely diagrammatic to illustrate the step in the process and is in no sense to scale. In the oven 5 the dinitrosopentamethylenetetramine decomposes with the evolution of gas, and the rubber, which is quite plastic, permits formation of numerous small cells around each bubble of gas. The structure is not a sponge as in foamed latex, and there are relatively only a few points on the surface where blowing has taken place. The vast majority of gas bubbles are in tight cells in the main body of the rubber. The surface produced, as is well known in the blown rubber field, is somewhat matte and is not shiny. This is desirable where the laminates are to be used for straps, belts, and the like with the rubber contacting skin.

After leaving the pre-curing oven, the rubber layer is still soft, but not sticky, the rubber being in no sense finally cured or vulcanized. The soft laminate then passes through a pair of embossing rolls, one smooth contacting the fabric backing and the other provided with grooves to emboss ridges on the rubber. The embossing rolls are shown diagrammatically at 6, the top view showing only the grooved roll as the smooth roll below is hidden by it. The showing is purely diagrammatic as the embossing rolls are of standard design and are in no way changed by the use of the present invention. Pressure between the rolls is maintained sufficient to emboss grooves of the desired depth but not sufficient to damage the elastic fabric backing.

After leaving the embossing rolls, the embossed laminates then pass through a curing oven 8, which is of length substantially the same as the blowing oven 5, so that the laminates are maintained in this oven for 30 minutes at the temperature indicated on the drawing, namely 300°–325° F. When the laminates emerge from the final curing oven, the rubber is fully vulcanized to soft rubber, the laminates pass through air and cool down, and are then wound up on take-up rolls 9.

It will be noted that the temperature in the oven 5 is sufficient to produce a laminate in which the rubber is soft but is not sticky and can be readily embossed in the embossing rolls 6 without sticking thereto and blurring the sharpness of the ridges or other pattern desired.

FIG. 2 shows a cross-section through the laminate at a point between weft threads in a woven elastic fabric. The elastic warp threads appear at 11 and the ridges embossed on the surface of the rubber layer 3 are shown at 10. It will be noted that the temperature, pressure, and rubber composition in the combining rolls 4 have caused a certain amount of flow of the rubber around the fabric warp threads, locking the two layers into a tight laminate. Obviously, of course, there will be some flow also around the weft threads, which, however, do not appear in FIG. 2. Because of the small scale of the figure, the cells in the rubber layer are shown by a few dots. This is a diagrammatic illustration, as of course there are an enormously greater number of tiny gas-filled cells in an actual product.

The following examples show typical elastomer formulations which can be used in the process of FIG. 1 within the temperature ranges set forth.

EXAMPLE 1

A mixed rubber, 80% being a copolymer of acrylonitrile and cis isoprene, in the ratio of 70/30. The formulation contains:

| | |
|---|---:|
| Acrylonitrile/isoprene | 80.0 |
| Pale crepe | 20.0 |
| Antioxidant | 1.0 |
| Benzothiazyl disulfate | 1.5 |
| Dibutyl phthalate | 15.0 |
| Stearic acid | 2.0 |
| Dinitrosopentamethylenetetramine | 4.0 |
| Urea | 2.2 |
| Calcium silicate | 20.0 |
| Titanium dioxide | 10.0 |
| Zinc oxide | 5.0 |
| Sulfur | 0.75 |
| 4,4' dithiodimorpholine | 1.4 |

A ribbon of the proper width to match a narrow fabric was extruded with a die temperature of 300° F. The rubber does not reach die temperature. The temperature in the combiner 9 was 220° F., the blow oven 5 280° F., and the cure oven 8 300° F.

EXAMPLE 2

The following formulation was prepared:

| | |
|---|---:|
| Cis 1, 4 polyisoprene | 100.0 |
| Antioxidant | 2.0 |
| Benzothiazyl disulfide | 0.5 |
| Mercaptobenzothiazole | 0.75 |
| Stearic acid | 2.0 |
| Dinitrasopentamethylenetetramine | 1.0 |
| Urea | 0.5 |
| Chlorinated vegetable oil | 10.0 |
| Titanium dioxide | 10.0 |
| Zinc oxide | 5.0 |
| Sulfur | 1.75 |

This was calendered on rolls and slit into suitable ribbon widths. Combining with the fabric took place at 210° F., the pre-cure and blow in oven 5 at 280° F., and the cure in oven 8 at 300° F.

EXAMPLE 3

The following formulation was prepared:

| | |
|---|---:|
| Smoked sheet | 100.0 |
| Paraffinic oil | 10.0 |
| Mineral oil | 20.0 |
| Stearic acid | 2.0 |
| Benzothiazyl disulfide | 0.5 |
| Zinc oxide | 5.0 |
| Antioxidant | 2.0 |
| Sodium bicarbonate | 9.0 |
| Calcium carbonate | 30.0 |
| 4,4' dithiodimorpholine | 1.0 |
| Mercaptobenzothiazole | 0.75 |
| Titanium dioxide | 10.0 |
| Sulfur | 1.75 |

This was calendered and then slit, combined with the fabric at 180° F., blown at 270° F., and cured at 300° F.

EXAMPLE 4

The following formulation was prepared:

| | |
|---|---:|
| Unsaturated polyurethane elastomer, sold by the Du Pont Co. under the name "Adiprene C" | 100.0 |
| Stearic acid | 2.0 |
| Titanium dioxide | 15.0 |
| Calcium carbonate | 30.0 |
| Sodium bicarbonate | 12.0 |
| Dicumyl peroxide | 2.0 |

The formulation was extruded from a die at 290° F., combined to the fabric at 210° F., blown at 280° F., and cured at 300° F.

EXAMPLE 5

A formulation was prepared as follows:

| | |
|---|---:|
| Epichlorohydrin | 100.0 |
| Gamma-glycidoxypropyltrimethoxysilane | 2.0 |
| Hydrated silica | 30.0 |
| Dinitrosopentamethylenetetramine | 4.0 |
| Zinc stearate | 0.75 |
| Calcium stearate | 2.0 |
| Titanium dioxide | 3.5 |
| Zinc oxide | 2.0 |
| 2-mercaptomidazoline | 1.5 |

It was extruded with a die temperature of 300° F., combined to the fabric at 230° F., blown at 285° F., and cured at 325° F.

For most purposes it is preferred to combine the elastomer with the fabric before blowing, as described above. For some purposes it is desirable to combine pre-blown elastomer with the fabric, and this modification is also included in the invention.

FIG. 1 illustrates the production of ribbon laminate. This represents an important, and probably the most important, single field for the present invention. However, the invention is in no sense limited thereto and can be used with laminates which are much wider, for example a laminate 60″ wide which may be used for garments such as girdles.

We claim:
1. A process of producing elastomer-fabric laminates comprising in combination and in sequence the following steps,
 (Step 1) producing a sheet of soft substantially uncured solid elastomer containing therein finely divided blowing agents capable of releasing gas on heating to a definite minimum temperature,
 (Step 2) bringing the solid elastomer sheet into contact with a fabric of approximately the same width, subjecting the two to heat and pressure sufficient to bond the solid elastomer sheet to the fabric without distorting the fabric, the temperature being below the minimum temperature at which the blowing agents release gas, (Step 3) subjecting the laminate to a temperature high enough to cause the blowing agents to produce gas to form a cell tight elastomer and for a sufficient time to render the elastomer layer of the laminate non-sticky but still plastic, (Step 4) embossing a predetermined pattern onto the elastomer layer of said laminate, and (Step 5) subjecting the laminate to a still higher temperature than in Step 3 and for a sufficient time to substantially cure the elastomer.

2. A process according to claim 1 in which the fabric is an elastic fabric having at least elastic warp threads.

3. A process according to claim 2 in which the elastomer is a rubber.

4. A process according to claim 3 in which the rubber is natural rubber.

References Cited

UNITED STATES PATENTS

| 2,752,279 | 6/1956 | Alderfer | 156—220 X |
| 3,123,508 | 3/1964 | Waugh | 156—78 |

CARL D. QUARFORTH, Primary Examiner

S. HELLMAN, Assistant Examiner

U.S. Cl. X.R.

156—78, 220; 264—321